UNITED STATES PATENT OFFICE.

ANDREW KALSTROM, OF MIDDLEBROOK, MISSOURI.

IMPROVEMENT IN BATHS FOR TEMPERING STEEL.

Specification forming part of Letters Patent No. 187,977, dated March 6, 1877; application filed January 10, 1876.

*To all whom it may concern:*

Be it known that I, ANDREW KALSTROM, of Middlebrook, in the county of Iron and State of Missouri, have invented a new and useful Improvement in Baths for Tempering Steel, of which the following is a specification:

My invention consists in the use of sal-ammoniac, the article known as "concentrated potash," and the cyanide of potassium, dissolved in water, as a bath for tempering steel. It is formed as follows for ordinary work: Take of cyanide of potassium and sal-ammoniac, each, one part, and of concentrated potash, eight parts. When mixed, dissolve one and one-quarter pound in two gallons of water.

In using, introduce the steel heated to a temperature somewhat lower than that required for tempering with the ordinary salt-water bath.

I am aware that cyanide of potassium has been employed as an ingredient in the preparations for tempering steel, and also that common potash has been so employed. My application relates, therefore, only to the use of concentrated potash, sal-ammoniac, and cyanide of potassium, when combined for the purpose.

What I claim as my invention, and desire to secure by Letters Patent, is—

A bath for tempering steel, compounded of the cyanide of potassium, sal-ammoniac, concentrated potash, and water, substantially in the proportions and as set forth.

In testimony whereof I have signed my name to this specification in the presence of two subscribing witnesses.

A. KALSTROM.

Witnesses:
JOHN SARGENT,
J. O. THERIEN.